United States Patent [19]

Day

[11] Patent Number: 5,280,213
[45] Date of Patent: Jan. 18, 1994

[54] ELECTRIC POWER CELL ENERGIZED BY PARTICLE AND ELECTROMAGNETIC RADIATION

[76] Inventor: John J. Day, 911 NW. 42nd Ave., Coconut Creek, Fla. 33066

[21] Appl. No.: 979,896

[22] Filed: Nov. 23, 1992

[51] Int. Cl.⁵ .................................. G21D 7/00
[52] U.S. Cl. ........................ 310/302; 310/305; 310/304; 136/253; 429/5
[58] Field of Search .............. 310/302, 304, 305; 136/253; 429/5

[56] References Cited

U.S. PATENT DOCUMENTS

| | | | |
|---|---|---|---|
| 2,661,431 | 12/1953 | Linder | 310/302 |
| 3,740,273 | 6/1973 | Adler et al. | 310/305 |
| 3,934,162 | 1/1976 | Adler et al. | 310/302 |
| 4,835,433 | 5/1989 | Braun | 310/305 |
| 5,111,099 | 5/1992 | Smith | 310/305 |
| 5,122,332 | 6/1992 | Russell | 310/304 |
| 5,124,610 | 6/1992 | Conley et al. | 136/253 |

Primary Examiner—Nelson Moskowitz
Attorney, Agent, or Firm—Sterne, Kessler, Goldstein & Fox

[57] ABSTRACT

A power cell which converts ionizing radiation into electrical energy. The power cell includes a multi-layer composite source element which includes a charged particle emitter layer, first and second source dielectric layers, a source collector layer and a source retarding layer. The source element is disposed within a multi-layer composite shield element having an absorber layer, first and second shield dielectric layers, a shield collector layer, and a shield retarding layer. An anode is connected to the emitter layer and a cathode to the collector layer. The emitter layer produces charged particles which interact with the dielectric layers to eject electrons which are collected by the collector layer to generate a potential between the anode and the cathode.

31 Claims, 6 Drawing Sheets

ELECTRIC POWER CELL ENERGIZED BY PARTICLE AND ELECTROMAGNETIC RADIATION

FIELD OF THE INVENTION

This invention relates to power cells. More particularly, it relates to power cells which convert ionizing radiation into electrical energy.

BACKGROUND OF THE INVENTION

The relationship between energy and matter is described by Einstein's theory of special relativity. This theory suggests that matter can be converted into energy and energy into matter. This relationship can best be demonstrated by observing the effects of ionizing radiation on bulk material. Ionizing radiation consists of a flux of particles or photons with sufficient energy to break up molecules or to detach electrons from atoms upon impact. At the moment of impact, electromagnetic energy (photons) is converted into mass (e.g., Compton electrons, secondary electrons, etc.). Similarly, mass in the form of energetic particles (e.g., electrons, neutrons, alpha particles, etc.) is attenuated to produce secondary electromagnetic energy, such as bremsstrahlung (radiation emitted by an electron accelerated in its collision with the nucleus of an atom, "braking radiation"). Therefore, as a steady flux of ionizing radiation passes through bulk material, it produces a dynamic condition where energy is converted into matter and matter into energy.

Radioisotopic decay, such as alpha decay or beta decay, generates charged particles. The movement of these charged particles therefore produces an electric current. Attempts have been made to convert the movement of these charged particles directly into electrical energy. However, directly producing electrical energy from radioisotopic decay has had numerous problems.

The first problem encountered is that the charged particles emitted during the decay contain a broad spectrum of energy levels. For example, in beta decay, a beta particle ($\beta^-$ or $_{-1}e^0$) is emitted. However, the emitted $\beta$ particles or electrons are not mono-energetic. Rather, there is a distribution of electron energies from zero up to the maximum energy of 13.4 MeV. A design directed at a particular energy level would lose lower energy level electrons because these electrons would have insufficient energy to get to the collector. Similarly, much higher energy level electrons would collide with the collector, generating heat, and attenuation into another energy level, resulting in losses as well. Such devices are typically high voltage, low current devices.

A second problem frequently encountered was leakage current losses. The leakage current occurred when higher energy electrons collide with the collector and would then be ejected out the back side of the collector. Additionally, leakage occurred through bremsstrahlung or "braking radiation." Bremsstrahlung radiation is produced in a collision between an electron and a positively charged nucleus. In order to prevent losses due to bremsstrahlung, very thick electron collectors were used which were very heavy and dense. As a result, only one or two plates could be used, so it was not possible to collect at a multiple of electron energy levels. Finally, leakage also occurred through back scattering, where the electromagnetic energy and the particles are back scattered 180° from a forward direction.

The efficiencies of and energy levels produced by prior designs were also quite low. These designs typically used one emitter electrode and one collector electrode. Therefore, when the energy was drawn off the collector electrode, it dropped in potential. The resulting drop in potential produces an "off time" while the potential builds back up on the collector electrode to the desired energy level. Once the desired collector energy level is achieved, the collection is done and the collector again drops in potential. This "off time" for collection resulted in low efficiency, and low total energy available.

Accordingly, prior to the development of the present invention, there was no device for the direct conversion of ionizing radiation into electrical energy which effectively converts charged particles from a multitude of energy levels, recovering some of the energy produced through back scattering and bremsstrahlung. Additionally, prior to the development of the present invention, there was no device which provided for a continuous potential on the collector electrode to preclude inefficiencies due to low collector potential.

SUMMARY OF THE INVENTION

It is with these problems in mind that the present invention was developed. The present invention is a power cell for converting ionizing radiation into electrical energy which captures the energy from charged particles having a multitude of energy levels, while minimizing inefficiencies due to leakage or low collector potential. In one aspect of the invention, the power cell includes a multi-layer source element which includes a charged particle emitter layer, first and second source dielectric layers, a source collector layer, and a source retarding layer. The source element is disposed within a shield element which includes an absorber layer which absorbs electromagnetic energy. The power cell further includes a regulator connected between the source collector layer and the source retarding layer for conducting charge current from the retarding layer to the collector layer. An anode is conductively connected to the emitter layer, and a cathode is conductively connected to the source collector layer. The power cell of the present invention can further include a third source dielectric layer, with the emitter layer disposed between the first and third source dielectric layers. A fourth source dielectric layer can also be included, with the source retarding layer disposed between the second and fourth source dielectric layers. The source and shield elements can be configured to form substantially cylindrical bodies.

In another aspect of the invention, the shield element also includes first and second shield dielectric layers, a shield collector layer, and a shield retarding layer. The power cell can further include a regulator connected across the shield collector layer and the shield retarding layer for conducting charge current from the shield retarding layer to the shield collector layer. The shield element can be configured to form a substantially cylindrical body.

In the various aspects of the present invention, the absorber layer can include depleted uranium. The emitter layer can include cobalt, particularly $^{60}_{27}Co$, cesium, particularly $^{137}_{55}Cs$, or strontium, particularly $^{90}_{38}Sr$. The source dielectric layers can include polyethylene. The source collector layer and the source retarding layer can include aluminum.

BRIEF DESCRIPTION OF THE DRAWINGS

The invention will be better understood with respect to the accompanying drawings, in which.

DESCRIPTION OF THE PREFERRED EMBODIMENTS

Figure 1:
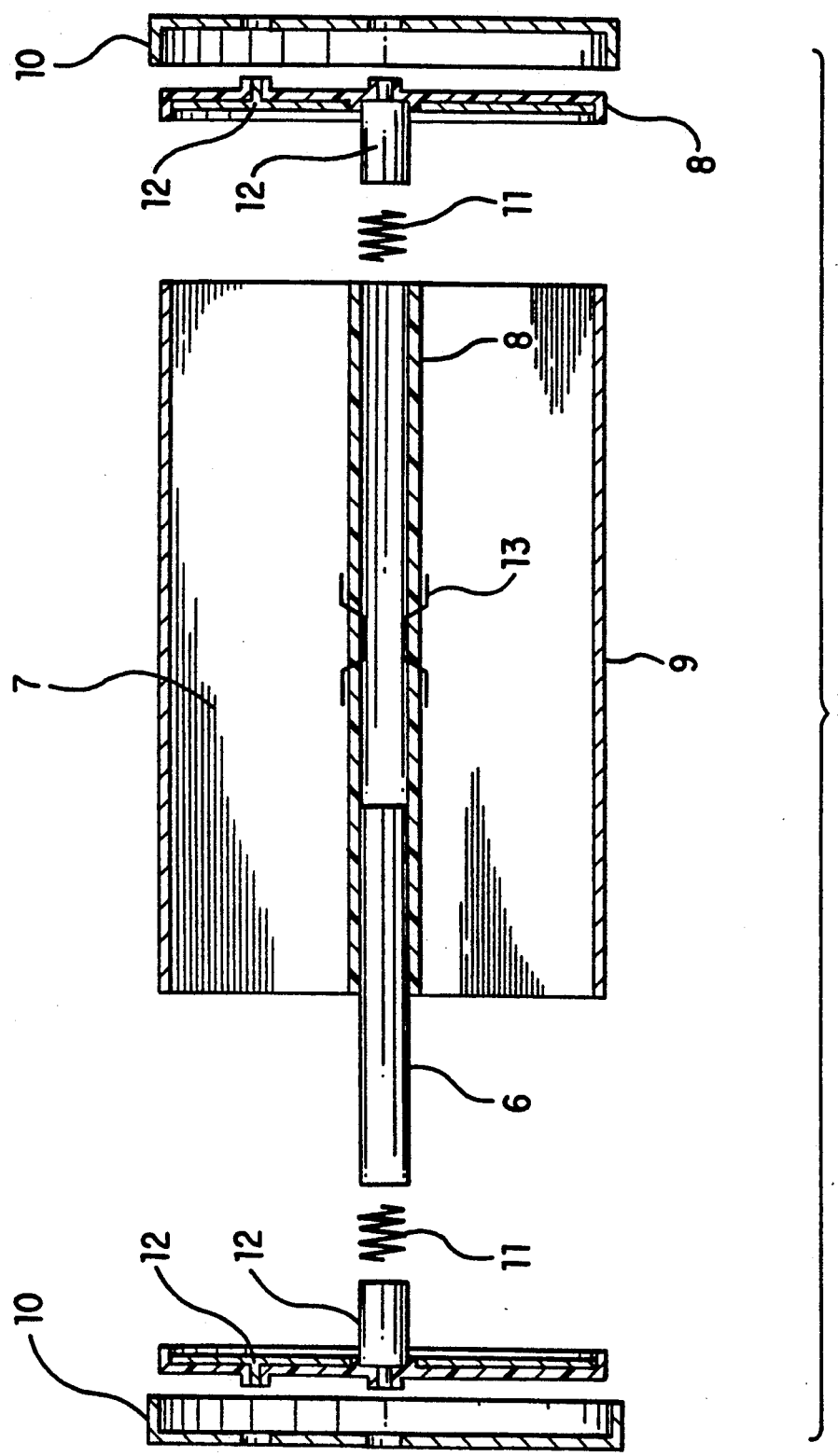
FIG. 1 shows an exploded longitudinal cross-section of a power cell.

With continuing reference to the drawing figures in which similar reference numerals are used throughout the description to describe similar features of the invention, an exploded longitudinal cross-section of a power cell of the present invention is shown in FIG. 1. The power cell 30 is enclosed within a casing 9 and closed by two end plates 10. In one presently preferred embodiment, the power cell is cylindrical in shape, with a central longitudinal opening for receiving the shield composite cylinder 7 and the source composite cylinder 6. The source cylinder 6 is received within the shield cylinder 7, and is electrically isolated therefrom by hydrogenous dielectric material 8. The source cylinder 6 is connected to external electrodes 12 through electrically conductive compression springs 11. The source cylinder 6 is grounded through an internal connection 13, and the shield cylinder is grounded to the outside casing 9.

The outside dimensions of the entire power cell 30 of the presently preferred embodiment, including the outside casing 9 and end plates 10, is approximately 76 cm in length with a diameter of 51 cm. As will be more fully explained below, the source cylinder is made of a multi-layer composite film having a thickness of approximately 1 mm. The multi-layer composite film is rolled to form the source cylinder 6. In one presently preferred embodiment, the source cylinder 6 has approximately 50 turns, with successive turns in a contiguous relationship. The structure of the source cylinder 6, and as will be seen, the power cylinder 7, formed by wrapping the multi-layer composite film around itself numerous times to form a multiplicity of contiguous cylindrically wound layers. The outside diameter of a preferred source cylinder 6 is approximately 5 cm, with a length of approximately 31 cm.

Figure 2:
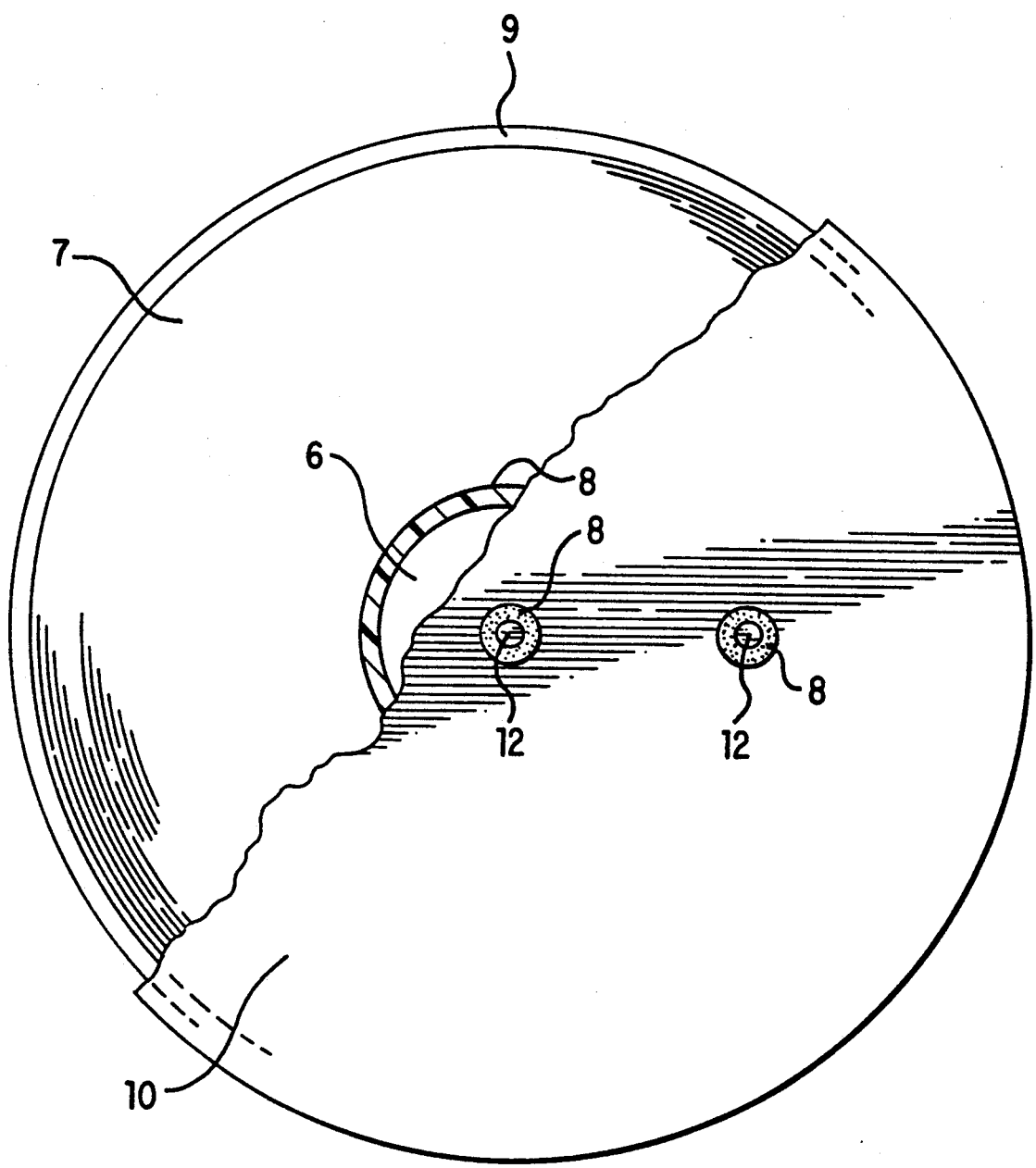
FIG. 2 shows a top plan view of the power cell shown in FIG. 1.
Figure 3:
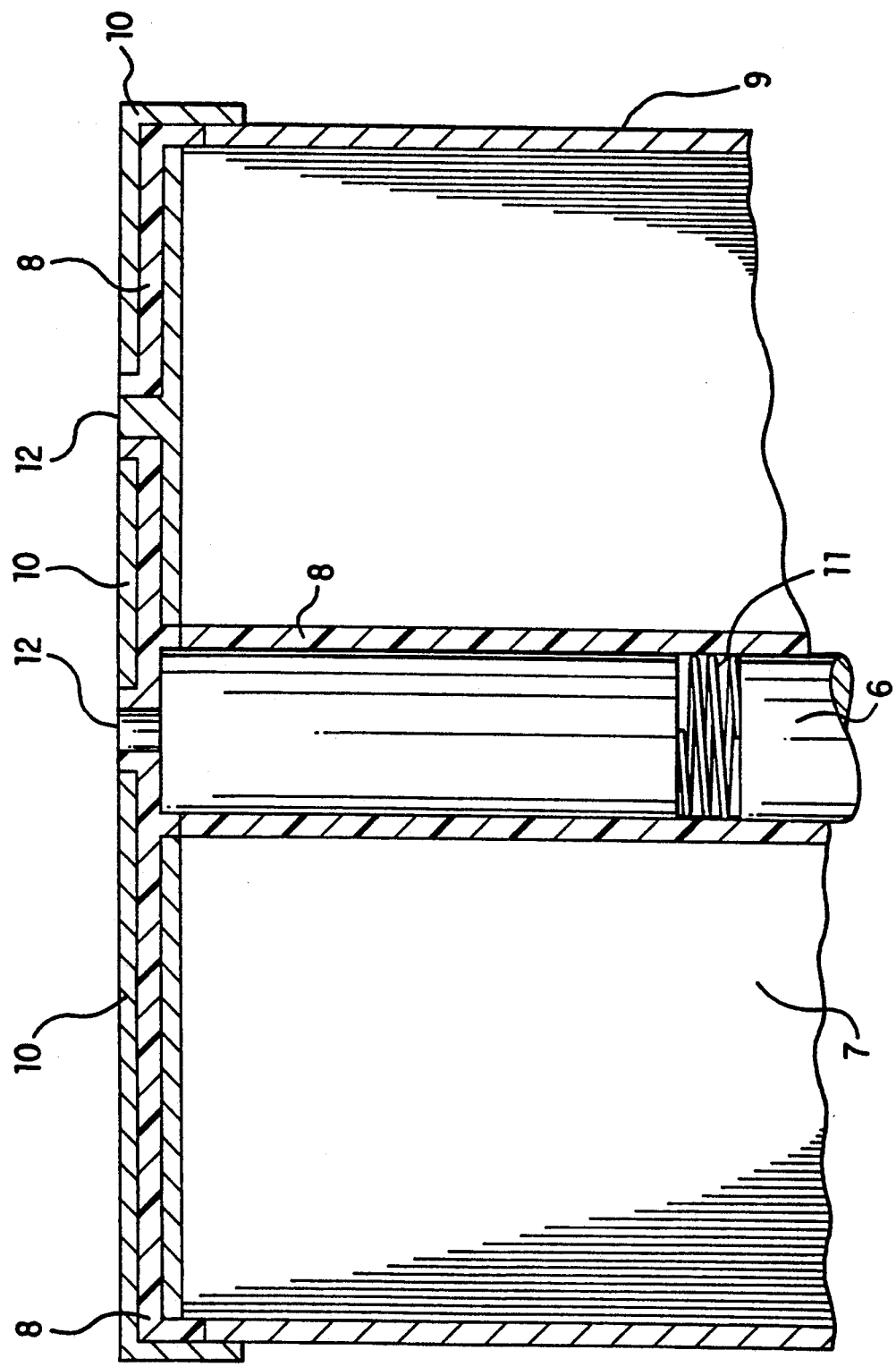
FIG. 3 shows an enlarged cross-section of one end of the power cell shown in FIG. 1.

In FIG. 2, a top plan view of the power cell of FIG. 1 is shown. One side of the end plate 10 is cut away to show the shield cylinder 7 and the source cylinder 6 which are separated by the dielectric material 8. Also shown are two electrodes 12. As can be seen from FIG. 1, the plan view of the bottom of the power cell 30 would be similar. FIG. 3 shows an enlarged cross-section of one end of the power cell shown in FIG. 1.

Figure 4:
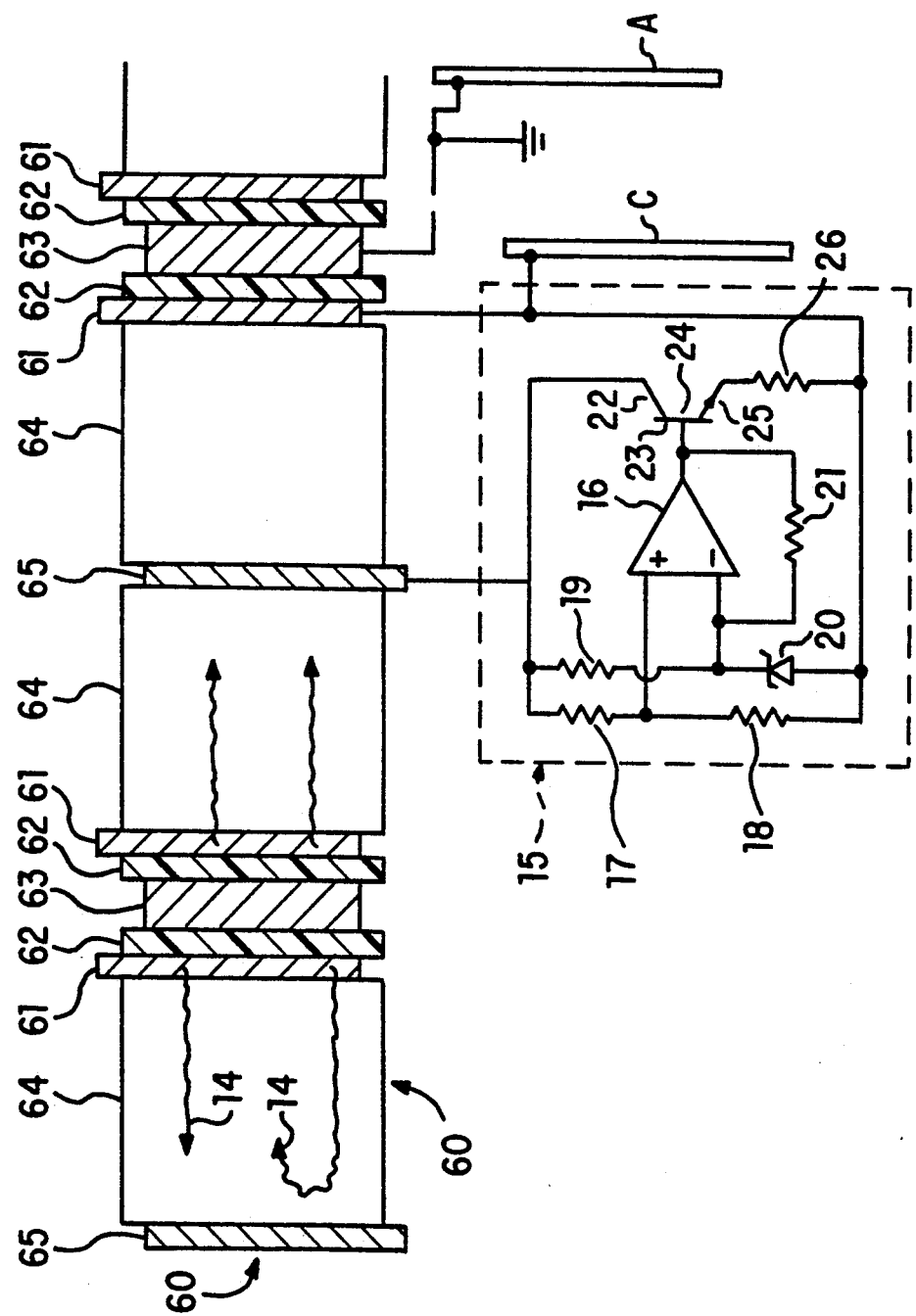
FIG. 4 shows a segment of a multi-layer power composite, a bleeder regulator, and an anode and cathode.

The configuration of the source cylinder 6 will now be described. By constructing the source cylinder 6 out of a series of thin film layers, each film layer having a different function, a composite can be built that will handle a wide range of emitted particles and produce a useful amount of current. FIG. 4 shows a segment or turn of the multi-layer source composite film 62 from which the source cylinder is formed. The source cylinder 6 is formed by winding the composite film 60 through contiguous turns to form a cylindrical shape for the presently preferred embodiment. Although only a cylindrical shape is shown in the figures and described herein, other configurations can be used.

The source composite film 60 is made of a plurality of thin film layers. A thin layer of a suitable radioisotope 63 is sandwiched between thin layers of a hydrogenous dielectric material 62. The radioisotope layer 63 emits charged particles 14 and thus acts as an emitter layer. The charged particles 14 pass through an expanded metal film layer 61 and into a thicker layer of a hydrogenous dielectric material 64. The final layer in the sequence is a retarding film 65, which is sandwiched between two thicker layers 64 of a dielectric material. As shown in FIG. 4, each segment or turn of the source cylinder 6 would include a repetitive sequence of layers including a layer 64 of dielectric material, a retarding layer 65, a layer 64 of dielectric material, a collector layer 61, a layer 62 of dielectric material, an emitter layer 63, and a layer 62 of dielectric material, and a collector layer 61. The sequence would then repeat itself in the next turn.

The radioisotope emitter layer 63 preferably would comprise isotopes of cobalt, cesium, or strontium. Particularly, $^{60}_{27}Co$, $^{137}_{55}Cs$, or $^{90}_{38}Sr$ can be used. The aforementioned isotopes are all beta emitters, a beta particle ($\beta^-$ or $_{-1}e^0$) is emitted through decay. Dielectric layer 62 would preferably be composed of an amorphous hydrogenous material such as polyethylene or polystyrene. Dielectric layer 64 is preferably thicker than layer 62, and can be made from the same, or similar material. Collector layer 61 preferably is a metallic film, such as aluminum, with approximately 70% open area so that most of the charged particles emitted by emitter layer 63 will pass through this layer initially. Retarding layer 65 is also preferably made from aluminum.

Figure 5:
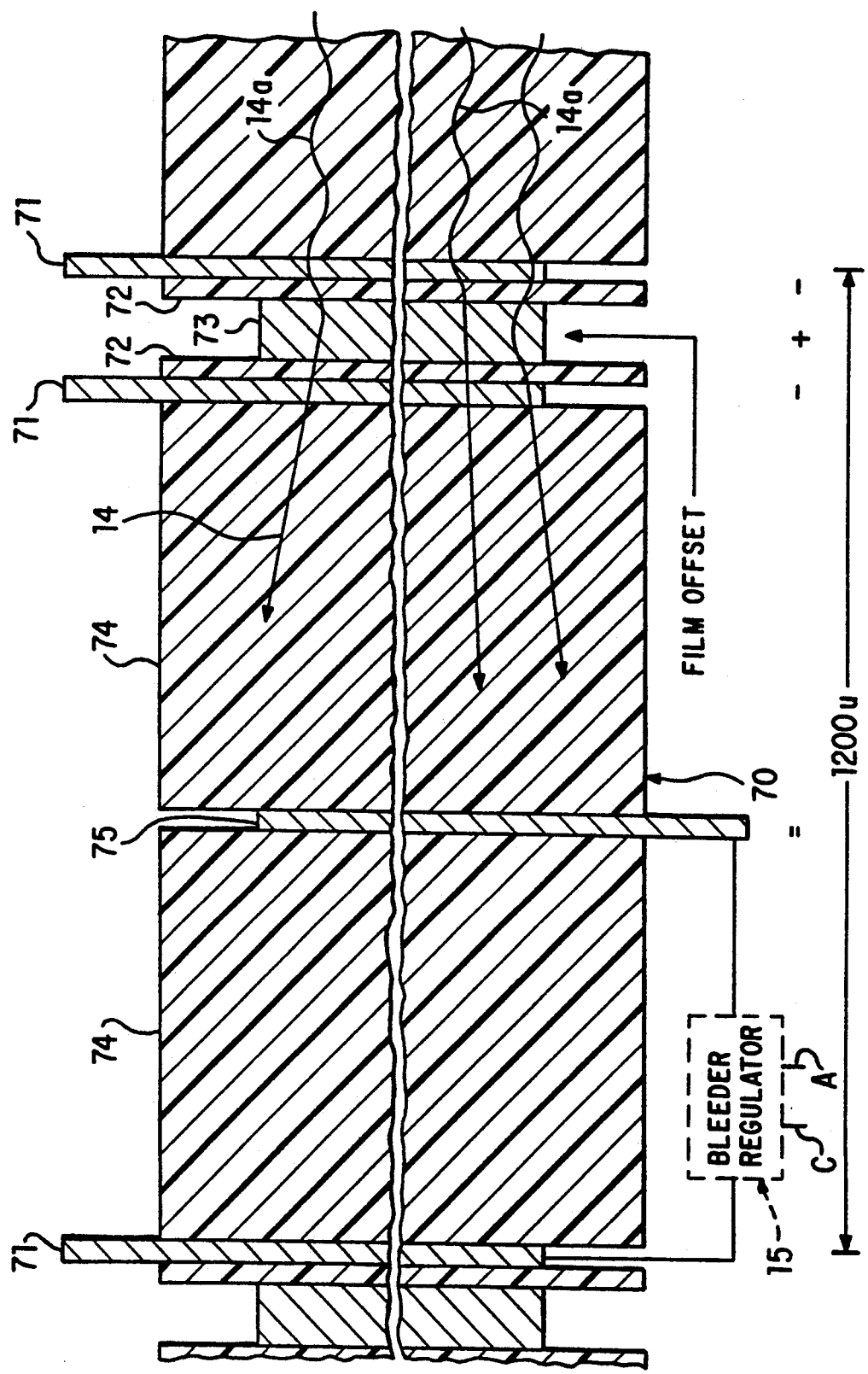
FIG. 5 shows a segment of a multi-layer shield composite cylinder and a bleeder regulator.

The shield cylinder 7 is constructed in a similar manner as the source cylinder 6. FIG. 5 shows a segment or turn of the multi-layer shield composite film 70 from which the shield cylinder is formed. The shield cylinder 7 is formed by winding the composite film 70 through contiguous turns to form a cylindrical shape for the presently preferred embodiment. Although only a cylindrical shape is shown in the figures and described herein, other configurations can be used.

The shield composite film 70 is comprised of a plurality of thin film layers. A thin layer of a suitable absorber 73 is sandwiched between thin layers of a hydrogenous dielectric material 72. The absorber layer 73 is a passibe absorber of electromagnetic energy 14a when then ejects a charged particle 14. The charged particles 14 pass through an expanded metal film layer 71 and into a thicker layer of a hydrogenous dielectric material 74. The final layer in the sequence is a retarding film 75, which is sandwiched between two thicker layers 74 of a dielectric material. As shown in FIG. 5, each segment or turn of the shield cylinder 7 would include a repetitive sequence of layers including a layer 74 of dielectric material, a retarding layer 75, a layer 74 of dielectric material, a collector layer 71, a layer 72 of dielectric material, an absorber layer 73, and a layer 72 of dielectric material, and a collector layer 71. The sequence would then repeat itself in the next turn. A shield cylinder of similar construction is described in U.S. Pat. No. 4,967,112 to Day, the disclosure of which is herein incorporated by reference.

Figure 6:
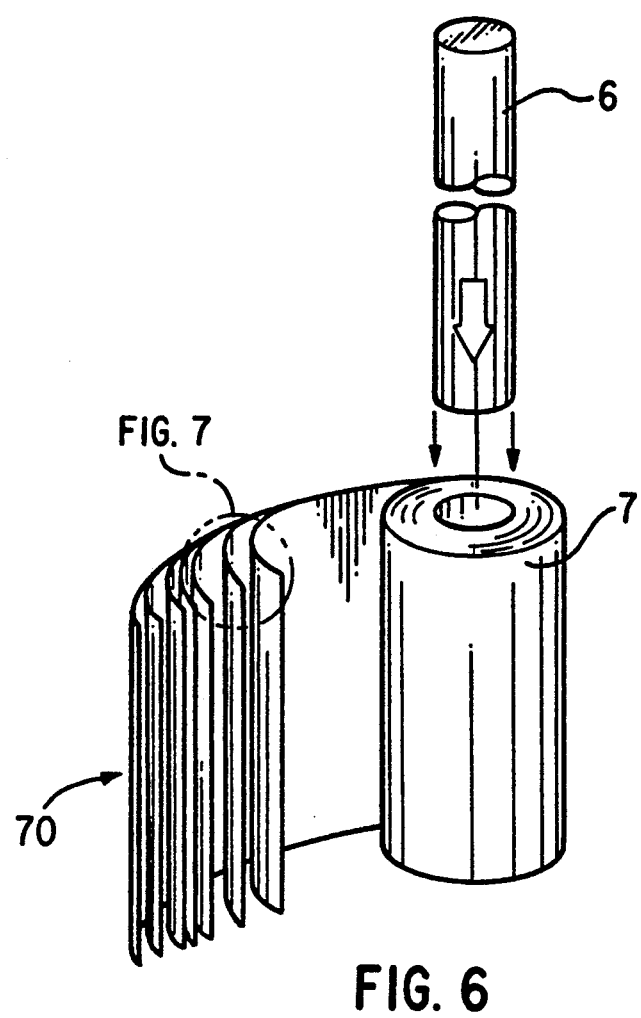
FIG. 6 shows a source cylinder and a shield cylinder.
Figure 7:
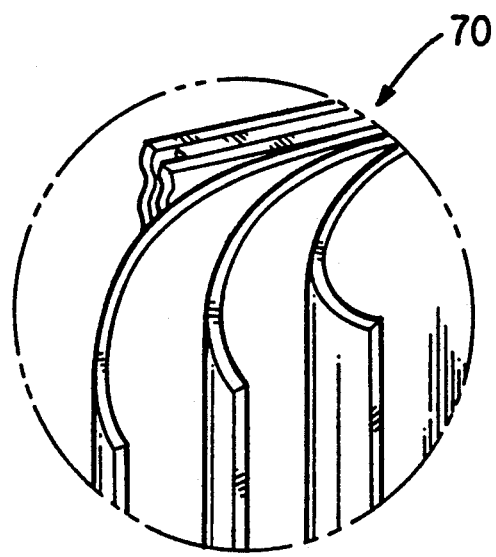
FIG. 7 shows an expanded view of the layers forming the shield cylinder of FIG. 6.

FIGS. 6 and 7 show the cylindrically wound layers of composite film 70 which forms shield cylinder 7. Source cylinder 6 would be formed in like manner from cylindrically wound layers of composite film 60.

Absorber layer 73 is preferably made from a material having a high Z or atomic number, such as depleted uranium, with aluminum used for retarding layer 75. An absorber layer of depleted uranium will not be an active emitter of charged particles. However, an absorber layer of depleted uranium will emit two electrons through daughter reactions when it absorbs a thermal neutron flux. Alternatively, a low Z material, such as aluminum could be used for absorber layer 73, with depleted uranium used for retarding layer 75. Collector layer 71 can be made from aluminum. Dielectric layers 72 and 74 can be made from amorphous hydrogenous material such as polyethylene and polystyrene. The collector layers, dielectric layers, and retarding layers are similarly constructed in both the source cylinder and the shield cylinder. They can be made from identical materials, but this is not required to construct the power cell of the present invention.

Referring to FIG. 4, charged particles 14 are emitted by the radioisotope emitter layer 63. Most of the charged particles then pass through collector layer 61 as it has approximately 70% open area because it is not desired to collect these particles on the first pass. The charged particles pass though the layers and be repelled and transferred into kinetic energy as beta particles onto retarding layer 65 which is at a high potential. The energy of the primary charged particle 14 is transferred into the field of the retarding layer 75 and through a bleeder regulator 15 into the collector layer 61. The purpose of the bleeder regulator 15 is to maintain the high potential on the retarding layer 65 in order that it can effectively absorb the kinetic energy of the primary charged particle, as well as repel the secondary electrons towards the collector layer 61. The bleeder regulator conducts charge current from the retarding layer 65 to the collector layer 61. Retarding layer 65 will be at a relatively high potential, and collector layer 61 will be at a relatively lower potential.

The bleeder regulator 15 has an operational amplifier 16 with its positive input terminal connected through a resistor 17 to the retarding layer 65 of each turn of the composite film and through a resistor 18 to the collector layer 61 of each turn of the composite film. Resistors 17 and 18 constitute a voltage divider for applying to the positive input terminal of amplifier 16, an input voltage that is proportional to the voltage difference between layers 61 and 61. The negative input terminal of amplifier 16 is connected through a resistor 19 to the retarding layer 61 and through a Zener diode 20 to the collector layer 61. A feedback resistor 21 is connected between the negative input terminal and the output terminal of amplifier 16. A shunt transistor 22 has its base electrode 23 connected to the output terminal of amplifier 16, its collector electrode 24 connected to the retarding layer 65, and its emitter electrode 25 connected through a resistor 26 to the collector layer 61. The emitter layer 63, in each turn of the composite film, is connected conductively to an external anode A, which is grounded. The collector layer 61, in each turn of the composite film, is connected to the external cathode C.

The electrical load that is to be energized by this power cell is connected across the anode A and the cathode C.

As the charged particles 14 move through the hydrogenous dielectric layers 62 and 64, secondary electrons are knocked loose along its path. These ionized secondary electrons form a pool, or reservoir, of electrons. The objective is to collect as many of these electrons as possible on the collector layer 61. The potential is held high on retarding layer 65 to collect the high potential secondary electrons, such as those which were raised in energy level through collision with an emitted beta particle.

The radioisotope emitter layer 63 throws off a charged particle in decay, and as those charged particles are stopped, or slowed down, bremsstrahlung or braking radiation is produced. This radiation will be collected in the shield. In some cases, as with decay of $^{60}_{27}Co$, gamma radiation is produced in addition to the charged particle. The gamma radiation is collected in the shield. The shield cylinder 7 therefore performs two functions. It acts as a radiation shield to preclude radiation from being transmitted outside of the power cell. Additionally, the composition of the shield cylinder attenuates the electromagnetic energy by converting it into electrical energy.

The capability to convert electromagnetic energy into electrical energy in the shield cylinder can best be seen in FIG. 5. Absorber layer 73 absorbs electromagnetic energy 14a produced by, for example, bremsstrahlung, as discussed above. Absorber layer 73 ejects a charged particle 14 which passes through the dielectric layers 72 and 74, knocking loose secondary electrons along its path. These electrons are collected by collector layer 71 in like manner as for the corresponding collector layer 61 in the source cylinder 6. Similarly, a bleeder regulator 15 is connected between retarding layer 75 and collector layer 71 as shown in FIG. 5. Collector layer 71 is at a low potential and retarding layer 75 is at a very high potential. As shown in FIG. 5, these layers are offset from each other so that when rolled into a cylinder, one end of the cylinder will contain a low potential electrode and the other end of the cylinder will contain a high potential electrode. Because the electrodes are at different ends of the cylinders, there will be no arcing between them. The collector layer 61 and retarding layer 65 are similarly offset in the source cylinder 6 to form a high potential electrode at one end and a low potential electrode at the opposite end of the power cell. In a presently preferred embodiment, the two high potential electrodes would be located at one end of the power cell, and the two low potential electrodes would be located at the other end of the power cell.

The energy levels of the beta particles or electrons emitted in the source cylinder by the emitter layer 63 are many times higher than the energy levels of the electrons collected in the shield cylinder 7. Accordingly, two different bleeder regulators are used, one for the source cylinder and one for the shield cylinder, because the voltage levels for the source cylinder will be different from the voltage levels for the shield cylinder. Thus, in the power cell, there will be four different potentials, a different potential for the source collector layer 61, source retarding layer 65, shield collector layer 71, and shield retarding layer 75. Control of these four potentials is accomplished through the two bleeder regulators.

External circuitry can be connected to the power cell through the anode A and cathode C. As shown in FIG. 4, the cathode is connected to the collector layer 61 through the bleeder regulator 15. The external circuitry transforms the voltage difference out of the power cell to that required for the particular load application.

The type of material used for the emitter layer 63, the thickness of the various layers of the film composite for the source cylinder and the shield cylinder, and the type of charged particles produced are interrelated as follows. For example, positively charged alpha particles have a very short range so the thickness of the film layers would be adjusted accordingly. Beta particles have a greater range, but neutrons and gamma rays have even greater range thus requiring the use of dense material in the shield. Therefore, the thickness of the layers comprising the source and shield cylinders will be varied depending upon the type of particles ejected by the emitter layer. For example, when using $^{60}_{27}Co$, gamma rays are produced so that the thickness of the shield should be greater. With $^{90}_{38}Sr$, low end beta particles are produced so only braking radiation is generated so that the thickness of the shield could be less. However, the energy levels are less in strontium than in cobalt so that a larger emitter layer of strontium would be required than for a cobalt emitter layer. The greater the area of the emitter layer, the more energy that is produced.

The power cell of the present invention is designed to compensate for the multiple energy levels of the charged particles produced through radioisotope decay. The retarding and collector layers, through the bleeder regulators, are able to collect electrons of multiple energy levels. Additionally, the composite multiple film layer design of the present invention makes use of the other types of radiation produced, such as bremsstrahlung and gamma rays, to produce electrical energy, as well as providing shielding from such radiation. Additionally, the power cell of the present invention does not experience the inefficiencies produced by "off times" from the collector layer because the potential is maintained through the bleeder regulator.

While various embodiments of the present invention have been described above, it should be understood that they have been presented by way of example only, and not limitation. For example, the power cell of the present invention can be configured with various other types of emitter layers, such as alpha emitters. Additionally, the configuration of the power cell can be varied, and is not limited to the cylindrical configuration shown. Thus the breadth and scope of the present invention should not be limited by any of the above described exemplary embodiments, but should be defined only in accordance with the following claims and their equivalents.

What is claimed is:
1. A power cell comprising:
   a shield element having a central opening comprising an absorber layer which absorbs electromagnetic energy;
   a source element received within said central opening comprising a plurality of layers, including a charged particle emitter layer, a first source dielectric layer, a source collector layer, a second source dielectric layer, and a source retarding layer;
   regulator means connected across said source collector layer and said source retarding layer for conducting charge current from said source retarding layer to said source collector layer wherein said source retarding layer and said source collector layer collect electrons at multiple energy levels, said regulator means maintaining a substantially uniform potential on said source collector layer;
   a ground anode conductively connected to said emitter layer; and
   a cathode conductively connected to said source collector layer;
   wherein said emitter layer produces a plurality of charged particles which interact with said first and said second source dielectric layers to eject electrons therefrom which are collected by said source collector layer wherein a potential is generated between said anode and said cathode.

2. A power cell as recited in claim 1, further comprising:
   a third source dielectric layer, wherein said emitter layer is disposed between said first and said third source dielectric layers; and
   a fourth source dielectric, layer, wherein said source retarding layer is disposed between said second and said fourth source dielectric layers.

3. A power cell as recited in claim 2, wherein said absorber layer comprises depleted uranium and said emitter layer comprises cobalt.

4. A power cell as recited in claim 3, wherein said emitter layer comprises $^{60}_{27}Co$.

5. A power cell as recited in claim 2, wherein said absorber layer comprises depleted uranium and said emitter layer comprises cesium.

6. A power cell as recited in claim 5, wherein said emitter layer comprises $^{137}_{55}Cs$.

7. A power cell as recited in claim 2, wherein said absorber layer comprises depleted uranium and said emitter layer comprises strontium.

8. A power cell as recited in claim 7, wherein said emitter layer comprises $^{90}_{38}Sr$.

9. A power cell as recited in claim 2, wherein said shield element further comprises a first shield dielectric layer, a shield collector layer, a second shield dielectric layer, and a shield retarding layer.

10. A power cell as recited in claim 9, further comprising:
    regulator means connected across said shield collector layer and said shield retarding layer for conducting charge current from said shield retarding layer to said shield collector layer.

11. A power cell as recited in claim 9, wherein said source element is configured to form a substantially cylindrical source body so that said plurality of layers forms a multiplicity of contiguous cylindrically wound layers.

12. A power cell as recited in claim 11, wherein said shield element is configured to form a substantially cylindrical shield body with an axial opening for receiving therein said source body.

13. A power cell, comprising:
    a shield element having a central opening;
    a source element received within said central opening comprising a plurality of layers, including a charged particle emitter layer, a first source dielectric layer, a source collector layer, a second source dielectric layer, and a source retarding layer; and
    regulator means connected across said source collector layer and said source retarding layer for conducting charge current from said source retarding layer to said source collector layer wherein said source retarding layer and said source collector layer collect electrons at multiple energy levels, said regulator means maintaining a substantially uniform potential on said source collector layer:

wherein said emitter layer produces a plurality of charged particles which interact with said first and said second source dielectric layers to eject electrons therefrom which are collected by said source collecting layer wherein a potential is generated between said emitter layer and said source collector layer capable of sustaining an electrical current.

14. A power cell as recited in claim 13, further comprising:

a third source dielectric layer, wherein said emitter layer is disposed between said first and said third source dielectric layers; and a fourth source dielectric layer, wherein said source retarding layer is disposed between said second and said fourth source dielectric layers.

15. A power cell as recited in claim 14, wherein said shield element comprises a plurality of layers including an absorber layer, a first shield dielectric layer, a shield collector layer, a second shield dielectric layer, and a shield retarding layer, said absorber layer absorbing electromagnetic energy.

16. A power cell as recited in claim 15, further comprising:

regulator means connected across said shield collector layer and said shield retarding layer for conducting charge current from said shield retarding layer to said shield collector layer.

17. A power cell as recited in claim 15, wherein said source element is configured to form a substantially cylindrical source body so that said plurality of layers forms a multiplicity of contiguous cylindrically wound layers.

18. A power cell as recited in claim 17, wherein said shield element is configured to form a substantially cylindrical shield body with an axial opening for receiving therein said source body.

19. A power cell as recited in claim 14, wherein said emitter layer comprises cobalt.

20. A power cell as recited in claim 19, wherein said emitter layer comprises $^{60}_{27}Co$.

21. A power cell as recited in claim 14, wherein said emitter layer comprises cesium.

22. A power cell as recited in claim 21, wherein said emitter layer comprises $^{137}_{55}Cs$.

23. A power cell as recited in claim 14, wherein said emitter layer comprises strontium.

24. A power cell as recited in claim 23, wherein said emitter layer comprises $^{90}_{38}Sr$.

25. A power cell as recited in claim 19, wherein one of said source dielectric layers comprises polyethylene, said source collector layer comprises aluminum, and said source retarding layer comprises aluminum.

26. A power cell as recited in claim 21, wherein one of said source dielectric layers comprises polyethylene, said source collector layer comprises aluminum, and said source retarding layer comprises aluminum.

27. A power cell as recited in claim 23, wherein one of said source dielectric layers comprises polyethylene, said source collector layer comprises aluminum, and said source retarding layer comprises aluminum.

28. A power cell as recited in claim 19, wherein said absorber layer comprises depleted uranium.

29. A power cell as recited in claim 21, wherein said absorber layer comprises depleted uranium.

30. A power cell as recited in claim 23, wherein said absorber layer comprises depleted uranium.

31. A power cell as recited in claim 15, further comprising:

a ground anode conductively connected to said emitter layer; and a cathode conductively connected to said source collector layer.

* * * * *